Patented Sept. 29, 1925.

1,555,663

UNITED STATES PATENT OFFICE.

HANS HAHL, OF ELBERFELD, GERMANY, ASSIGNOR TO FARBENFABRIKEN VORM. FRIEDR. BAYER AND CO., OF LEVERKUSEN, NEAR COLOGNE-ON-THE-RHINE, GERMANY.

PHARMACEUTICAL COMPOUND.

No Drawing. Application filed December 10, 1924. Serial No. 755,059.

*To all whom it may concern:*

Be it known that I, HANS HAHL, a citizen of Germany, residing at Elberfeld, in the State of Prussia, Germany, have invented new and useful Improvements in a New Pharmaceutical Compound, of which the following is a specification.

The present invention concerns the production of the hitherto unknown alkaline earth metal salts of complex antimony compounds which are derived from mercapto carboxylic acids e. g. the antimony calcium salt of thioglycollic acid having most probably the formula:

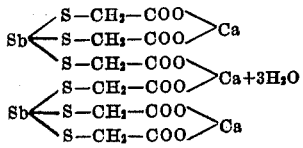

They are slightly yellowish to whitish powders of a weakly alkaline reaction soluble in water and are valuable spirillocides.

In order to illustrate the new process more fully the following example is given:—

20 parts by weight of thioglycollic acid and 6 parts by weight of antimony oxide ($Sb_2O_3$) are heated together with 60 parts by weight of water until the greater part of the antimony oxide is dissolved. The liquid is filtered and the filtrate is almost completely neutralized with calcium carbonate. The mixture is poured into alcohol. The new product is thus precipitated in the form of a white powder containing about 25 per cent of antimony.

The other alkaline earth metal salts are prepared in an analogous manner.

Other mercapto carboxylic acids e. g. the ortho-mercaptobenzoic acid (thiosalicylic acid) may be used.

I claim:—

1. The process of producing alkaline earth metal salts of complex antimony compounds of mercapto carboxylic acids, which process consists in treating the mercapto carboxylic acid with an oxy derivative of the trivalent antimony and neutralizing the resulting product with a suitable alkaline earth metal compound, substantially as described.

2. The herein described alkaline earth metal salts of complex antimony compounds of mercapto carboxylic acids, being whitish powders soluble in water with a weakly alkaline reaction and being valuable spirillocides, substantially as described.

3. The herein described calcium salt of the complex antimony compound of the thioglycollic acid having most probably the following formula:

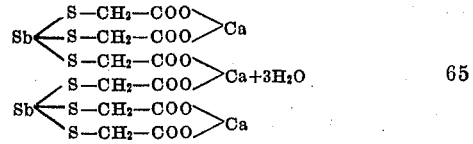

being a whitish powder, soluble in water with a weakly alkaline reaction, containing about 25 per cent antimony and being a valuable spirillocide, substantially as described.

In testimony whereof I have hereunto set my hand.

HANS HAHL.